(12) United States Patent
Wuest (10) Patent No.: US 6,342,262 B1
(45) Date of Patent: Jan. 29, 2002

(54) PROCESS AND DEVICE FOR PREPARING MEALS

(75) Inventor: Ernst Wuest, Rheineck (CH)

(73) Assignee: Menu System AG, St. Gallen (CH)

( * ) Notice: Subject to any disclaimer, the term of this patent is extended or adjusted under 35 U.S.C. 154(b) by 0 days.

(21) Appl. No.: 09/474,363

(22) Filed: Dec. 29, 1999

(30) Foreign Application Priority Data

Dec. 30, 1998 (CH) .............................................. 2586/98

(51) Int. Cl.[7] .............................. A23L 1/00; A47J 27/00
(52) U.S. Cl. ...................... 426/510; 99/473; 99/474; 99/476; 126/20; 126/21 A; 426/523
(58) Field of Search .................................. 426/510, 511, 426/523; 99/473, 474, 476, 516; 126/20, 21 A; 219/401

(56) References Cited

U.S. PATENT DOCUMENTS 5,619,983 A * 4/1997 Smith .......................... 126/20

FOREIGN PATENT DOCUMENTS

WO WO 97/49320 * 12/1997

* cited by examiner

Primary Examiner—George C. Yeung
(74) Attorney, Agent, or Firm—Browdy and Neimark (57) ABSTRACT

The device includes an oven, the inside of which is a space designed to hold food to be cooked and which is designed to generate saturated steam inside this space. The device also includes a dosing appliance for water which presents a duct which passes through one of the walls of the oven. In this duct, there are valves to control the supply of water into the cooking space. The outlet of this device is directed towards a heating element which is also located in the cooking space. The device also includes a steam condenser which is connected to the cooking space.

25 Claims, 8 Drawing Sheets

PROCESS AND DEVICE FOR PREPARING MEALS

FIELD OF THE INVENTION

The present invention relates to a process and apparatus for preparing foods using steam.

DESCRIPTION OF THE RELATED ART

EU-PS 0 463 703 discloses a process of this generic type and an oven for carrying out this process. In the previously known process, explosion-like puffs of steam are generated inside the hermetically sealed inner chamber of the oven. These puffs of steam cause a relatively high pressure to develop in the inner chamber of the oven casing or shell. This pressure exerts mechanical strain on the casing or shell of the oven, especially on a seal in the region of the door opening in the casing, a seal on the shaft of a fan, the door hinges and the closing mechanism of the oven door. Furthermore, in this previously known process, steam pressure is present in the cooking space. For example, if the oven is installed in an airplane and the door is opened, a large amount of steam escapes into the inside of the aircraft. The inside of the airplane is hermetically sealed against the outside so that under these circumstance the escaped steam condenses on the inner walls of the airplane and on the inside of the windows of the airplane, which should be avoided.

Where large quantities of food are prepared, steam may condense on the inside of the oven with the result that pools of water form on the floor of the oven. When the oven door is opened this condensed water may run out into the inside of the aircraft. In a plane which is not equipped with the latest technology it is virtually impossible to connect the oven to a drainage pipe. Consequently the condensed water flows out onto the floor of the aircraft which is a further undesirable side-effect.

BRIEF SUMMARY OF THE INVENTION

The object of the present invention is to eliminate these and other disadvantages of the prior art.

According to the present invention, food is cooked using saturated steam as a source of thermal energy by the following steps;

Spraying water into the cooking cavity of an oven;

Heating the mist obtained from spraying the water to produce saturated steam;

Discontinuing spraying water once sufficient saturated steam has been produced to cook the food;

Permitting the heat energy of the saturated steam to cook food in the cavity;

After the saturated steam has cooked the food, and once the temperature of the saturated steam has dropped to a degree that the steam is no longer saturated, conveying the wet steam into a second cavity;

In the second cavity, cooling the wet steam rapidly so as to condense water;

Collecting the condensed water in the floor region of the second cavity; and

Spraying the next dose of water into the cooking cavity.

An apparatus for conducting the process of the present invention includes an oven comprising a cooking or first cavity;

A condenser comprising a cooling or second cavity which is placed outside of the coven and which is connected to eth cooking cavity;

Means for injecting doses of water into the cooking cavity of the over, the means for injecting water having a control unit for controlling the function of the oven and of the condenser.

BRIEF DESCRIPTION OF THE DRAWINGS

Embodiments of the process and apparatus of the present invention are explained below in more detail with reference to the attached drawings, in which.

DETAILED DESCRIPTION OF THE INVENTION

Figure 1:
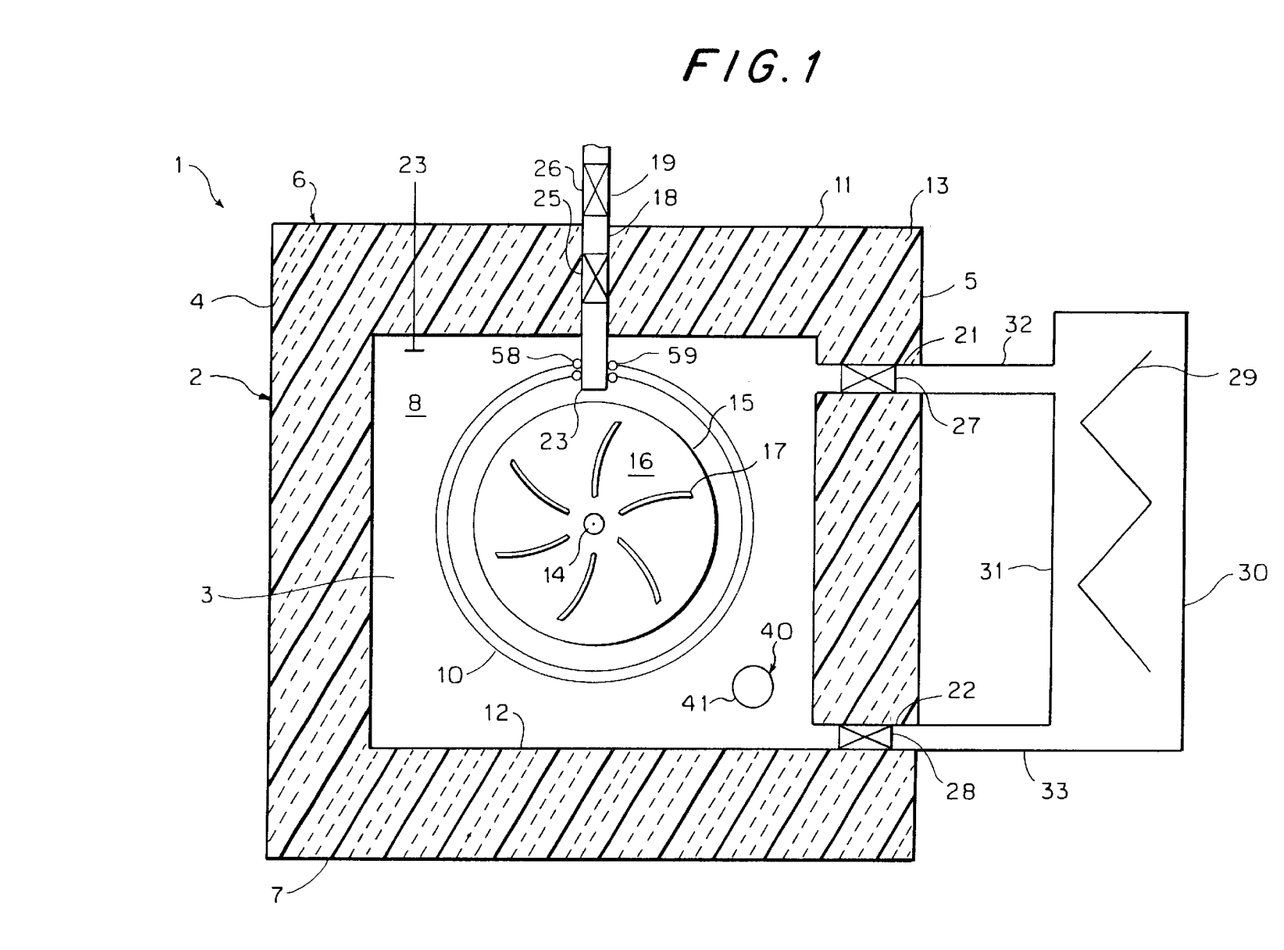
FIG. 1 shows as a diagram and in a vertical section an initial embodiment of the device for carrying out the present process, whereby this device presents a steam condenser.

The device for preparing foods as shown in a vertical section in FIG. 1 has an oven 1. This oven 1 can present a substantially parallelepiped casing 2 in which there is a cooking space 3 for the food to be prepared. One of the walls of the casing 2, which in the example shown is the front wall of the casing, is constructed as a door which is connected to the main part of the casing 2 in a conventional manner, for example by means of hinges. As the vertical section in FIG. 1 is approximately in the middle of the main part of the casing 2, the door and the hinges mentioned are in front of the cutting plane and therefore not shown in FIG. 1.

The main part of the casing 2 has two lateral walls 4 and 5, a ceiling 6, a floor 7, and a rear wall 8. These fixed walls 4 to 8 of the casing 2 and also the door have an outer envelope 11 and an inner envelope 12, which are, for example, made of an impact-resistant material, advantageously of metal. Between these envelopes 11 and 12 there is conventional thermally insulating material 13.

Figure 8:
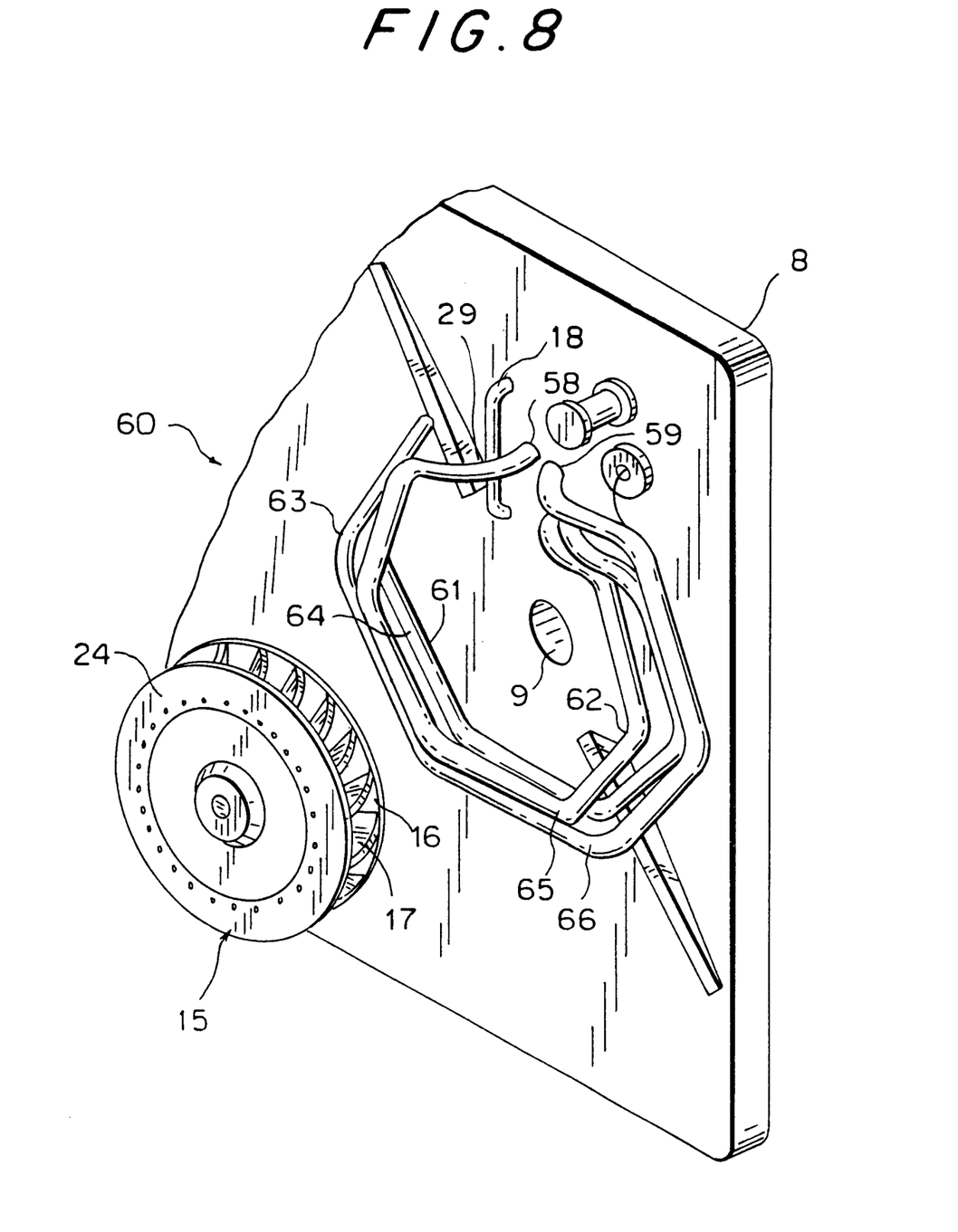
FIG. 8 shows in an exploded diagram a fan and a heating device assigned to this fan.

The door allows access to the cooking space 3 for loading and unloading foods. The door is constructed in a conventional manner in such a way that the cooking space 3 can be closed so that it is watertight. For this, a self-contained strip (not shown) made of a flexible material, e.g. rubber, can be used, this strip being attached between the front of the oven walls 4 to 7 and the inside of the door. This strip of material runs around the periphery of the opening which is closed by the door in the main part of the casing 2, which is limited at the sides by the previously mentioned oven walls 4 to 7. The strip of material can be attached either to the door or to the main part of the casing 2. Furthermore, a closing device (not shown) is provided for the door, which can be of a conventional type approved for use in aircraft. The device includes a fan 15 (FIGS. 1 and 8), the operation of which can be controlled by a control unit (not shown). The control unit is advantageously attached to the outside of the rear wall of the casing 8. It can, however, also be placed outside the oven. The fan 15 is constructed as a turbine wheel which is secured to the shaft 14 of a driving motor (not shown). The turbine wheel 15 is located in the cooking space 3 while the motor is installed outside the cooking space 3. In the present case the fan 15 is attached to the rear wall 8 of the oven 1. In this case the shaft 14 passes through an opening 9 (FIG. 8) in this rear wall of the casing 8 and the opening 9 where the shaft 14 runs through is watertight and steam-tight. The motor is attached to the outside rear wall of the casing 8. However, the shaft 14 can also pass through a different wall of the casing 2, such as for example the ceiling 6 of the same. The turbine wheel 15 has a disk 16 which is secured to the middle of the primary shaft 14 of the motor. This disk 16 can be built into the oven wall 8. The surface of the disk 16 facing into the inside of the cooking space 3 has blades 17 which project axially from the disk 16 and run in a curve from the center of the disk 16 towards its outer edge. The edges of the blades 17 projecting away from the disk 16 are linked together by means of a ring 24 (FIG. 8).

The fan 15 serves among other things to circulate air and steam (fluid) in the cooking space 3. Among other things, this circulation enables the temperature of the cooking space 3 to be maintained at virtually the same level everywhere throughout the preparation of the food and to ensure that there is an intensive exchange of heat between the fluid and the food in the cooking space 3.

Inside the cooking space 3 of the casing 2 there is at least one heating element 10 and/or 60, which works in conjunction with the fan 15. The heating element 10 and/or 60 is attached to the inside of one of the secured walls of the main part of the casing 2. In the example given, the heating element 10 and/or 60 is located at the inside of the rear wall of the casing 8. The heating element 10 and/or 60 can be connected in a conventional manner by means of the control unit to an appropriate source of energy, advantageously in the form of an electrical appliance.

The heating element 10 shown in FIG. 1 has essentially the form of an open ring which almost completely surrounds the periphery of the fan 15. The gap or interruption in the ring or heating element 10 and/or 60 is located in the upper region or area of the apex of the heating element 10 and/or 60, thus forming a gap 29 in the heating element 10 and/or 60. This gap 29 is limited laterally by the extremities of the heating element 10 and/or 60. In the area of the extremities of the open ring 10 there are bushes or sockets 58 and 59 to which the source of energy is connected.

Parallel to the longitudinal direction of the shaft 14, the heating element 10 and/or 60 has a depth comparable with that of the fan 15, i.e. with the clearance between the disk 16 and the ring 24 of the fan 15. Consequently, the fan 15 is surrounded by the heating element 10 and/or 60 not only along its circumference but also throughout its depth and/or width. This has the advantage that drops of water that are flung off the periphery of the fan 15 as it rotates land on a relatively large surface of the heating element 10 and hence are converted into steam practically immediately.

FIG. 8 shows in perspective a concrete embodiment of the heating element. This heating element 60 comprises three heaters 61, 62 and 63, of which each one is in the shape of an open pentagon. In the region of the extremities of the heaters 61, 62 and 63, the ends run virtually perpendicular to the rear wall 8 of the casing of the oven 2. Each of heaters 61, 62 and/or 63 also includes a center section 64, 65 and 66 respectively, which lies between the extremities 58 and 59 and runs substantially parallel to the wall 8 on which the heaters 61 to 63 are attached.

The extremities of the individual heaters 61 to 63 vary in length so that the central sections 64, 65 and 66 of the heaters 61 to 63 are arranged at varying distances from the wall 8. In the example given, the lengths of the extremities are such that the central sections 64 to 66 of the heaters 61 to 63 lie next to one another, when viewed along the shaft 14. At the same time, the extremities of the first heater 61 are the shortest so that the central section 64 of this heater 61 is closest to the wall 8. The longest are the extremities of the third heater 63, the central section 66 of which is situated the furthest from the wall 8. In between is the central section 65 of the heater 62. The diameter of the heaters 61 to 63 is such that the adjacent central sections 64 to 66 of the heaters 61 to 63 cover or surround virtually the whole width of the turbine wheel 15 between the disk 16 and the ring 24 of the same.

In the cooking space 3 there is also a temperature sensor 23. In the example given, this temperature sensor 23 is installed in the upper region of the cooking space 3. In the example given, the line of the temperature sensor 23 passes through the ceiling 6 and is also connected to the control unit.

Between the envelopes 11 and 12 of the ceiling 6 there is a section of pipe 18. An extension of this section of pipe 18 is located in the cooking space 3 and this extension lies between the extremities 58 and 59 of the heating element 10 and/or 60. The section of pipe 18 continues outside the ceiling 6 in the form of a free section 19 of the pipe. The free end of this free section of pipe 19 can be connected to a water supply network in a manner known in the art. In the section of pipe 18 there are valves 25 and 26 whose operation can be controlled by means of the previously mentioned control unit. The throttle valves 25 and 26 can be of a conventional type. The size of the clear opening (cross-section) of the section of pipe 18 is varied by means of throttle valves 25 and 26.

The section of pipe 18 can be installed in such a way that the opening of the pipe which is located inside the cooking space 3 faces towards one of the components of the oven 1 from which water is injected to form mist and/or steam. If the opening of the feeder pipe is directed towards the turbine wheel 15, water that is brought through the section of pipe 18 into the cooking space 3 in the form of a spray or jet is first turned into mist by the rotating turbine wheel 15. This mist is flung against the heating element 10 and/or 60 by the turbine wheel 15, and the mist is converted into steam. If the section of pipe 18 is directed against heating element 10 and/or 60 the jets of water are converted directly into steam.

Between the envelopes 11 and 12 of one of the walls of the casing 2 there are two more sections of pipe 21 and 22, one end of which opens into the cooking space 3 and the other leads outside. In the example given, the sections of pipe 21 and 22 are located in one of the vertical lateral walls 5 of the oven casing 2. These sections of pipe 21 and 22 can, however, also be located in the rear wall 8 of the casing 2. One of these sections of pipe 21 is located at the top near the ceiling 6 of the casing 2. The other section of pipe 22 is at the bottom in the region of the inner envelope 12 of the floor 7 of the casing 2. In the top section of pipe 21 there is a check valve 27, the operation of which can be regulated by the control unit. In the bottom section of pipe 21 there is another check valve 28 whose operation can also be controlled by the control unit.

Figure 2:
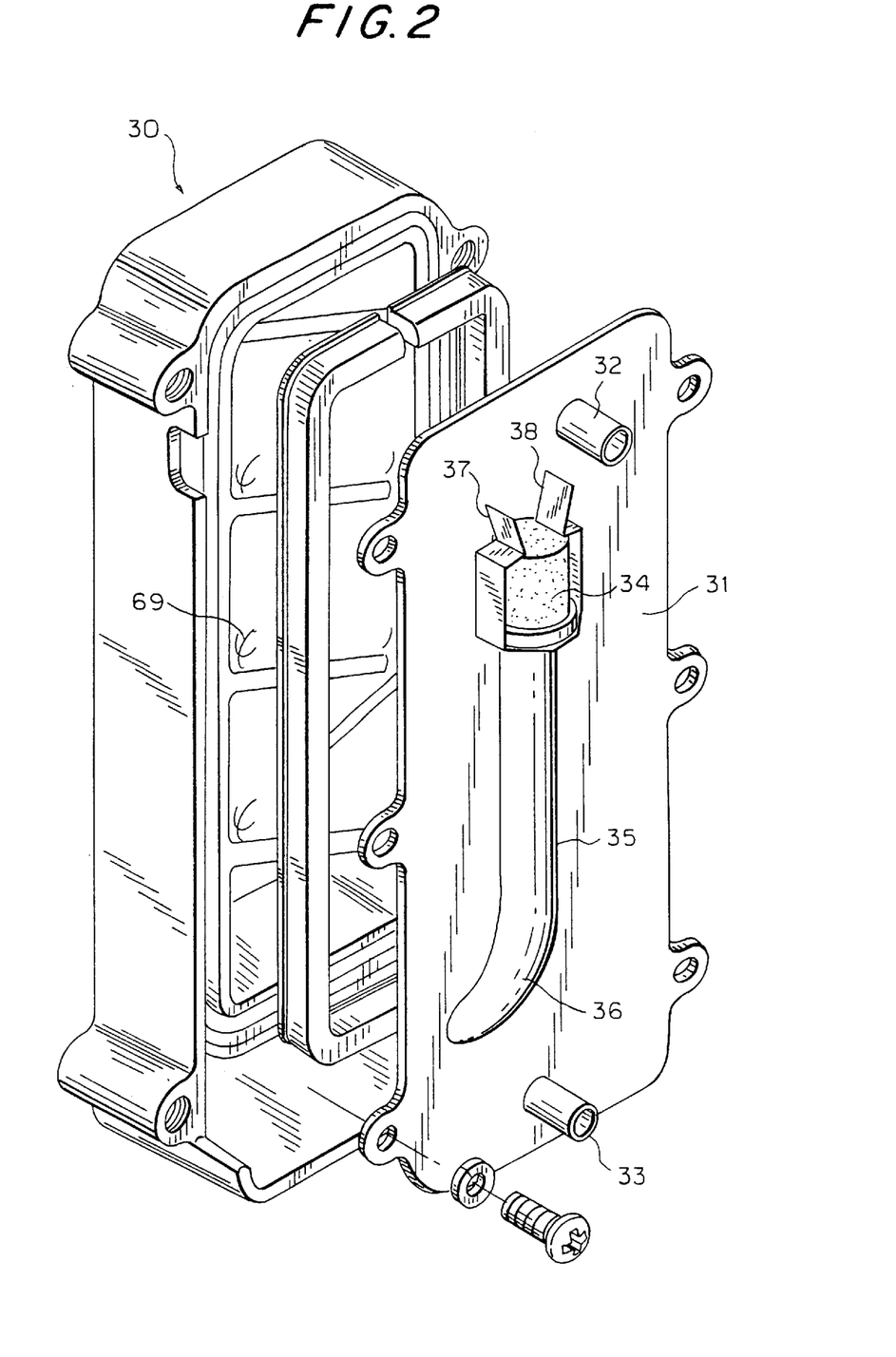
FIG. 2 shows in an exploded diagram the steam condenser shown in FIG. 1.

The present device also has a condenser 30 for steam produced in the cooking space 3. FIG. 2 shows this condenser 30 in an exploded diagram. In the example given, the condenser 30 is assigned to the outside of the previously mentioned lateral wall 5 of the casing 2. The condenser 30 may, however, also be assigned to the outside of the rear wall 8 of the casing 2. On the inside of the condenser 30 there are known types of medium 69 which accelerate the production of steam. Such a medium 69 may consist of plates, fins, etc. arranged in a suitable manner inside the condenser 30. Feeders 32 and 33 project from the lateral wall 31 of the condenser 30 that faces the oven 1. The other ends of these are connected to the sections of pipe 21 and 22 in the casing 2.

On the outside of the previously mentioned condenser wall 31 there is an outlet or exhaust 35. This outlet or exhaust 35 has a section of pipe 36 which is secured to the outside of the condenser wall 31. The lower end of this section of pipe 36 passes through the condenser wall 31 and opens out inside the condenser 30 in the region of the bottom part of the condenser 30, The top end of the section of pipe 36 has a sponge-like damping piece 34 attached to it which covers the opening of the section of pipe 36 that ends here. This end of the section of pipe 36 has two sprung tongues 37 and 38 facing each other which press the damping piece 34 against the mouth of the section of pipe 36 and which also enable the damping piece 34 to be changed. Instead of the damping piece 34 a cooling devices may be installed which is described below.

Figure 3:
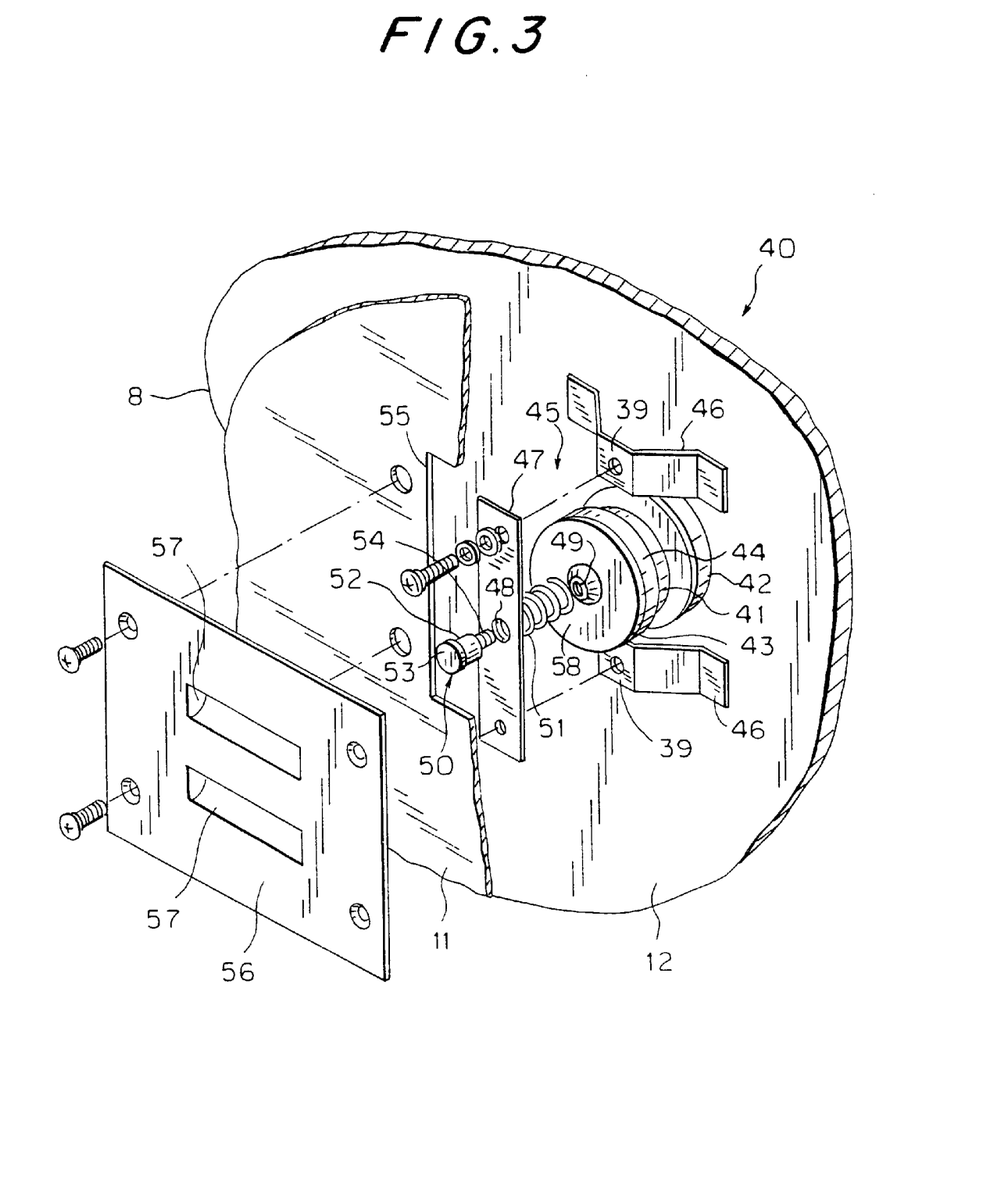
FIG. 3 shows in an exploded diagram a safety valve from the device of in FIG. 1.

Safety regulations require that every container in which pressure builds up must have a safety valve. In the present device the maximum value of the pressure is relatively low. There is no valve system commercially available that is suitable for such low pressures. In FIG. 3 a safety valve 40 of the present device is shown in an exploded diagram. In the inner envelope 12 of one of the walls of the casing 2 there is an opening 41, in the example given this is the inner envelope 12 of the rear wall 8 of the casing 2. In the example given, this opening 41 has a circular contour. A valve face 42, located on the outside of the inner envelope 12 and, in the example given, circular, is assigned to this opening 41. Facing this valve face 42 there is a valve gate which may take the form of a disk and/or pot with a low surrounding wall 44 or similar. The front of the surrounding wall 44 and/or the edge of the disk touches the valve face 42 and forms a seal when the valve 40 is closed.

The valve system 40 also includes a system 45 which serves the purpose of bringing the valve gate 43 to the valve face 42. This system 45 consists of two spacing elements 46 which are located next to the valve face 42 and which are diametrically opposed to one another in relation to the valve face 42. The distance of the faces 39 of the spacing elements 46 that are turned away from the inner envelope 12 is greater than the distance of the rear surface 58 of the valve gate 43 from the inner envelope 12. The previously mentioned system 45 also includes a strip 47 that is long enough to bridge the gap between the spacing elements 46. Each end of this strip 47 is attached to the face 39 of one of the spacing elements 46. In the middle section of the strip 47 there is an opening or borehole 48 which lies flush with a threaded hole 49 in the middle section of the rear wall 58 of the valve gate 43.

It is intended that a screw 50 should go through the central opening 48 in the strip 47 and its bolt is then screwed into the screw hole 49 in the valve gate 43.

A coil spring 51 surrounds the threaded bolt of the screw 50. One end of this spring 51 is on the inside of the strip 47 and the other end of the spring 51 is on the rear wall of the valve gate 43. Thus the spring 51 presses the valve gate 43 away from the strip 47 and against the valve seat 42.

The head of the screw 52 has two sections 53 and 54 which follow one another in the longitudinal direction of the screw 50. The first or outside head section 53 has a greater diameter than the second or inside section 54. The diameter of the first head section 53 is greater than the diameter of the central opening 48 in the strip 47. Consequently, this first head section 53 cannot go through the opening 48 in the strip 47. This head section 53 is located on the outside of the strip 47. The periphery of this first head section 53 can be shaped in the form of a hexagon.

The second head section 54 has a cylinder-shaped outer surface, its diameter being such that this head section 54 can go through the central opening 48 in the strip 47. The length of this second head section 54 is at least as large as the travel of the valve gate 43. When the pressure in the cooking space 3 increases to the point where it exceeds the contact pressure of the coil spring 51, the valve gate 43 is pushed away from the valve face 42. At the same time the second head section 54 is displaced accordingly into the opening 48 in the strip 47 in the longitudinal direction of the screw 50. This second head section 54 operates together with the coil spring 51 as a guide for the valve gate 43.

This valve system 40 is located essentially between the envelopes 11 and 12 of the casing wall. In the outer envelope 11 there is a suitable larger opening 55 in order to allow access for assembly and maintenance work on the valve system 40 in the casing wall. This opening 55 can be closed by means of a cover 56 which has slits 57. Steam etc. can escape from the casing 2 through these slits 57 after the valve system 40 has opened. This valve system 40 can also be installed on the door of the oven 1.

The control unit is designed in such a way that it can control the coordinated operation of individual components of the present device by means of a program stored in the control unit. The control unit can also contain a system for determining time intervals, i.e. a clock and/or a clock generator.

To begin operation of the apparatus of the present invention, the steam release valve 27 and the water release valve 28 are completely open. After the food to be prepared has been put in the cooking space 3 and the oven door has been closed the program stored in the control unit first triggers the measurement of the temperature by the temperature sensor 23 in the cooking space 3. At this time the temperature is mostly around 5 degrees Celsius because of the food in cooking space 3, which is usually deep-frozen.

After the temperature in the cooking space 3 has been determined the first phase T1 of the operation of the oven 1 begins. Right at the beginning of this operating phase T1 the turbine wheel 15 starts to rotate. The heating element 10 and/or 60 is connected to a source of energy by the control unit so that the temperature in the cooking space 3 starts to rise. This continues until a pre-set upper temperature of e.g. max. 85 degrees Celsius is recorded by the thermometer sensor 23 in the cooking space 3. Once the upper temperature has been reached the first operating phase T1 is finished and a second operating phase T2 begins. During this second operating phase T2 the turbine wheel 15 continues turning and the steam release valve 27 and the water release valve 28 remain open.

At the beginning of the second operating phase T2, water is forced intermittently in bursts into the cooking space 3 via the section of pipe 18 and/or 19. These intermittent bursts of water are controlled by the throttle valves 25 and 26 positioned in sequence in the section of pipe 18 and/or 19, whereby these throttle valves 25 and 26 are triggered alternately by the control unit. This means that one of the throttle valves 25 and 26 controls the amount of water injected while the other valve is completely open. This can take place during a pre-determined initial time phase Z1, which may last for instance for 1 minute. During a second time phase Z2 following the first, which may also coincide with the following minute, the roles of the throttle valves 25 and 26 are reversed by the control unit so that the valve which was completely open now controls the supply of water. The other valve is completely open throughout this second time phase Z2.

The alternate operation of the throttle valves 25 and 26 during the time phases Z1 and Z2 occurs for safety reasons. If only one of the throttle valves 25 or 26 were to be used and if this valve should fail to close the cooking space 3 would fill up with water. This water might then run out of the cooking space 3 and cause damage in the vicinity of the oven when the door to the cooking space 3 is opened. However, if the two throttle valves 25 and 26 are used in the manner described, the correctly functioning valve will cut off the water supply.

The amount of water supplied to the cooking space 3 is controlled by alternately opening and closing each of the throttle valves 25 and 26 controlling the water supply. The control valve is opened by the control unit on expiration of a pre-determined waiting time W for a brief period F. The valve can, for example, remain open for a period F of 50 milliseconds on expiration of a waiting time W of 3 to 10 seconds. This causes injections of water into the cooking space 3 during a period F of, for example, 50 milliseconds, with a waiting time W of 3 to 10 milliseconds between two successive water injections.

The temperature in the cooking space 3 is maintained at a pre-set level during the second operating phase T2 by the heating element 10 and/or 60 being switched on and off alternately. The fan 15 ensures that the fluid circulates in the cooking space 3 and is distributed evenly so that the thermal energy is intensively conveyed to the food. The temperature in the cooking space 3 is in excess of 85 degrees Celsius during this operating phase T2. Thus the amount of water injected evaporates immediately and the level of humidity in the cooking space 3 is increased. The higher the humidity in the cooking space 3 the more intensively the thermal energy is transferred from the fluid to the food. After the steam in the cooking space 3 is saturated, the control unit ends the water injections by closing the throttle valves 25 and 26 in the section of pipe 18 and 19 respectively.

This second operating phase T2 ends when the overpressure in the cooking space 3 caused by the development of the steam on the heating element 10 and/or 60 has been reduced by condensing the steam in the condenser 30. The length of this operating phase T2 is determined primarily by the amount of food to be cooked in the cooking space 3 as well as by the temperature of the food when it is put into the cooking space 3. These circumstances can be taken into account by the control unit when the length of time allowed for operating phase T2 is determined. Consequently it is not necessary to measure the pressure in the cooking space 3 during the present process.

When the operating phase T2 is completed the throttle valves 27 and 28 are closed in the supply lines 32 and 33 leading to the condenser 30 and they remain closed during a third operating phase T3. During this third operating phase T3 saturated steam condenses in the cooking space 3 due to the loss of thermal energy to the food in cooking space 3 until the temperature of the steam has dropped. When the temperature of the cooking space 3 has dropped to such an extent that the steam in the cooking space 3 is no longer saturated the steam release valve 27 in the upper supply line 32 to the condenser 30 opens, starting a fourth operating phase T4. The fluid now flows through this outlet line 32 into the condenser 30 where the steam portion of the fluid condenses to water. The air portion of the fluid escapes from the condenser 30 through the outlet or exhaust 35. This completes the first operating cycle of the present invention.

At the beginning of the next operating cycle there is again a supply or injection of water into the cooking space 3 through the section of pipe 18 and/or 19 in the same way as described above in connection with the second operating phase T2. The control unit triggers the continuation of a supply of water in the form of water jets until the steam in the cooking space 3 is once again saturated. This second operating phase T2 is followed by the previously described third and fourth operating phases T3 and T4.

These operating cycles consisting of the previously described operating phases T2 to T4 are repeated until the food is ready.

During the last phase of the present process which may last 30 seconds, for example, no more water is injected into the cooking space 3. After that the steam release valve 27 in the upper supply line 32 is opened so that steam from the cooking space 3 can condense to form water in the condenser 30. The condenser 30 can also be regarded as a collector for the condensation water.

When the oven door is opened the steam release valve 27 and the water release valve 28 are opened. Consequently the condensed water that has collected in the condenser 30 can run off through the bottom connecting line 33 to the floor 7 of the oven 1, where the residual heat converts it into steam. This steam escapes from the cooking space 3 through the door aperture when the oven door is opened. However, as this condensed water is only a small amount of water and/or steam the fact that it escapes outside is not a problem. It is important that in this process there is no possibility of any puddles of water forming on the floor 7 of the cooking space 3.

Figure 4:
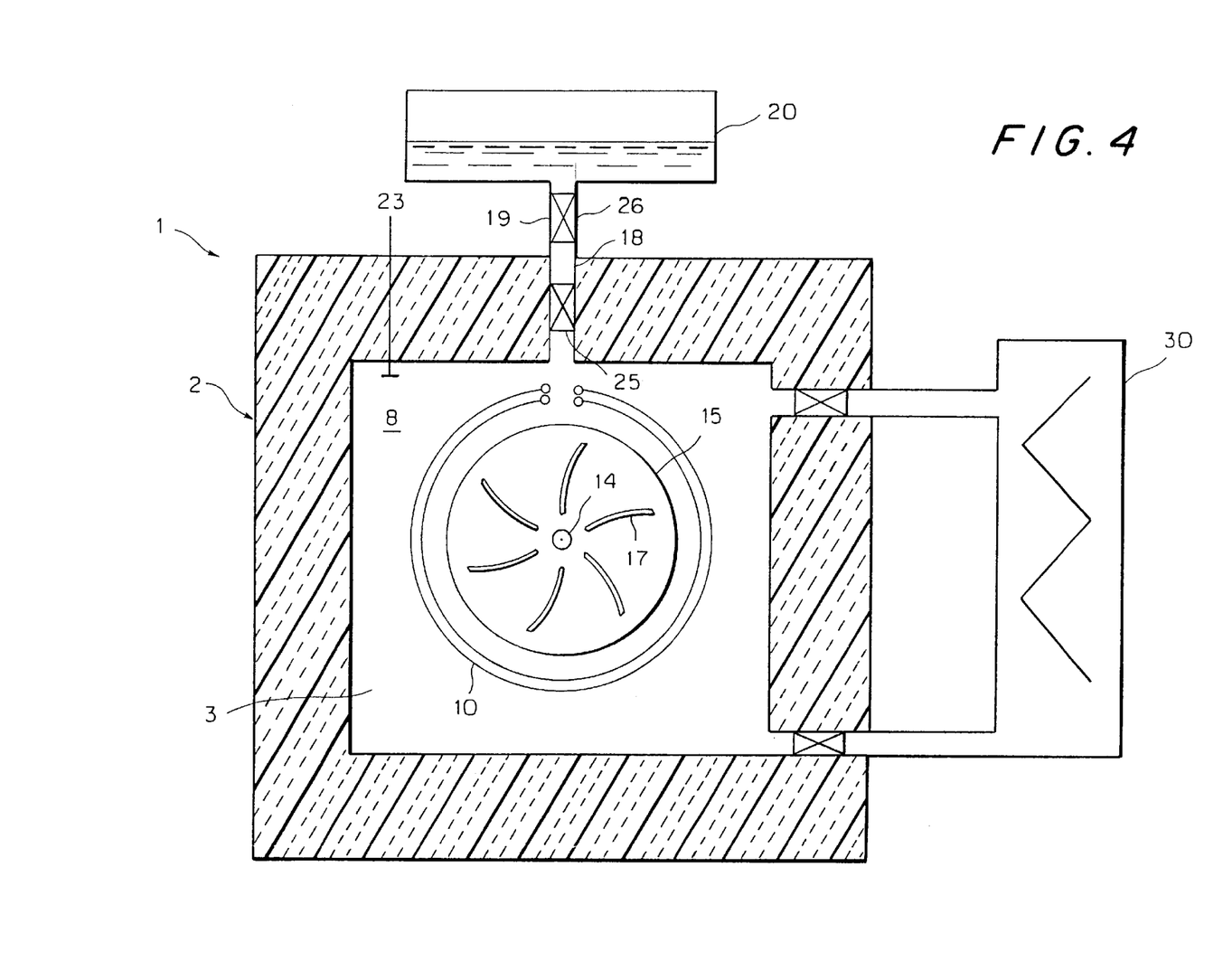
FIG. 4 shows in a diagram and in a vertical section a second embodiment of the device for carrying out the present process.

FIG. 4 shows a further embodiment of the present device. Instead of being connected to a water supply, this device possesses a container 20 for collecting water. This container 20 is installed above the oven 1. One end of the section of pipe 19 is connected to the floor of the container 20. The other end of the section of pipe 19 is connected to the far end of the section of pipe 18 so that water from the container 20 can run into the cooking space 3, carried by its own weight, when the throttle valves 25 and 26 are open. The container 20 can be constructed as a removable container. Such a container 20 can be filled with water outside the installation area of the oven 1. An oven 1 constructed in this manner can be operated independently of the water supply, e.g. on board an aircraft.

Figure 5:
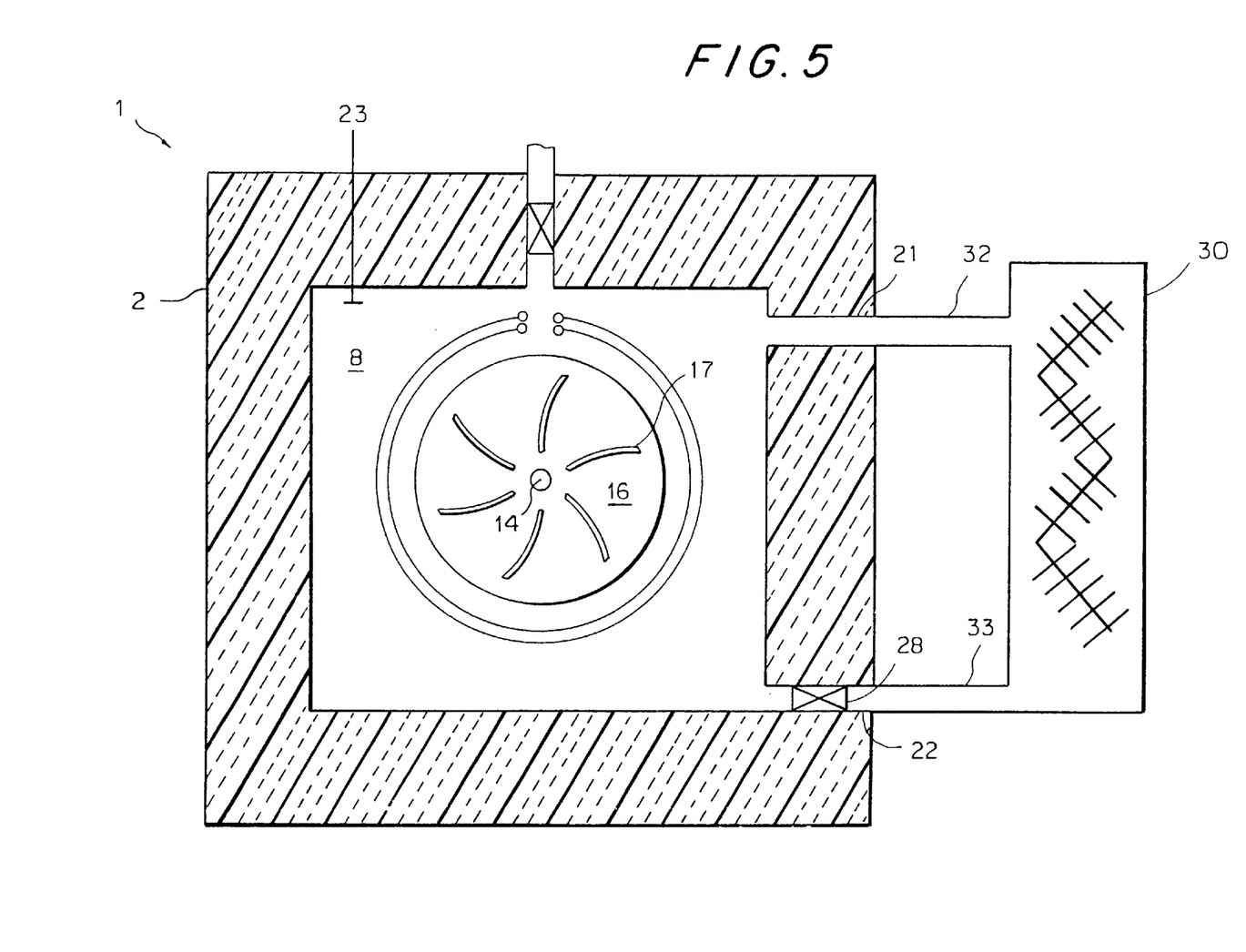
FIG. 5 shows in a diagram and in a vertical section a third embodiment of the device for carrying out the present process.

FIG. 5 shows a further embodiment of the present device in which the steam release valve in the section of pipe 21 carrying steam to the condenser 30 is absent. In this version of the device the inner flow resistance in the condenser 30 must therefore be relatively high so that the fluid from cooking space 3 cannot easily escape into the condenser 30. This special version of the condenser 30 is indicated by a different symbol which is used for the inner construction of the condenser 30 in FIG. 5.

Figure 6:
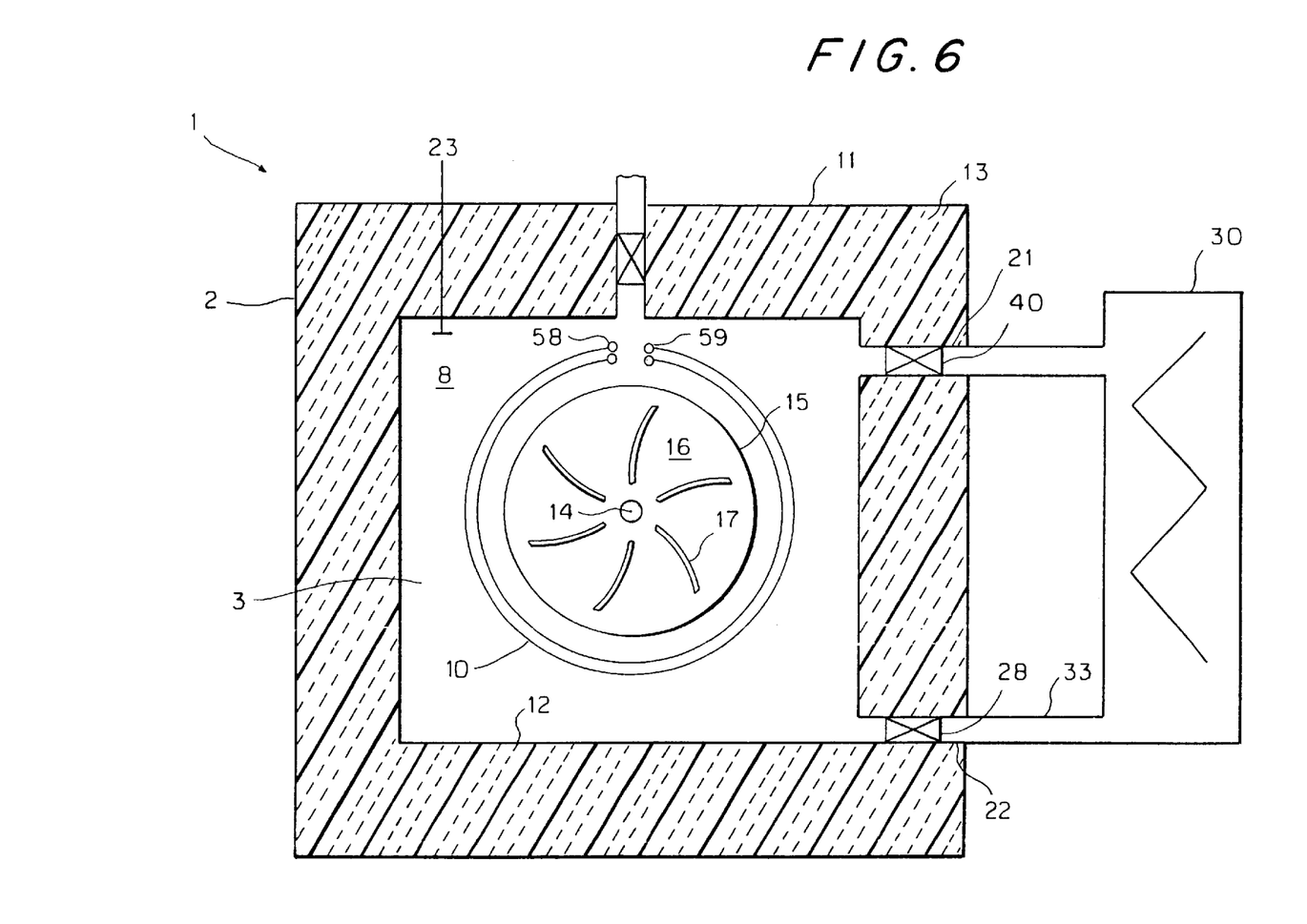
FIG. 6 shows in a diagram and in a vertical section a fourth embodiment of the device for carrying out the present process.

The embodiment of the present device shown in FIG. 6 differs from the previous ones in particular in that the steam supply pipe 32 has been eliminated. Hence the condenser 30 is connected to the casing 2 of the oven 1 only via the previously described waste water pipe 33. In the bottom section of pipe 22 the valve 28 is installed in the manner previously described. In the upper section of pipe 21 the previously described safety valve is installed.

In this device the previously described cycles of the present process can also be executed because the condenser 30 can also be hermetically sealed off from the oven 1 by closing the bottom valve 28. Moreover, it is actually of no great significance that the steam has to pass through the bottom section of pipe 33 into the condenser 30 in order to condense. In this regard, the only significant factor is the difference between the pressure in the cooking space 3 and the pressure in the condenser 30.

Figure 7:
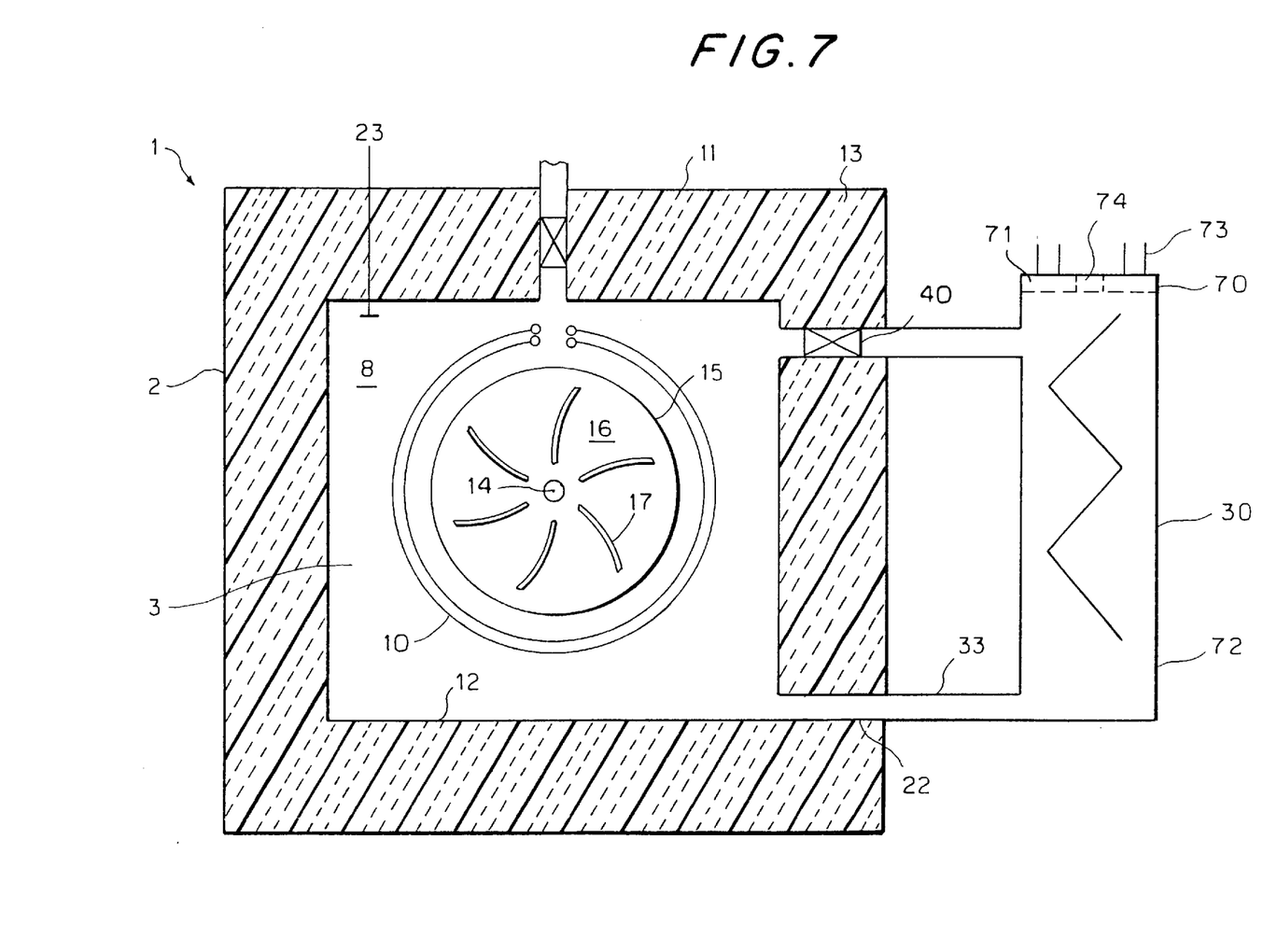
FIG. 7 shows in a diagram and in a vertical section a fifth embodiment of the device for carrying out the present process.

FIG. 7 shows a further embodiment of the present device which is based on the version shown in FIG. 6 and on which even the valve 28 in the bottom section of pipe 22 is eliminated. On this device, however, the cross-section of the pipe 22 and/or the line 33 must be smaller than it is on the previously described embodiments of the present device. This is in order to protect the condenser 30 from being overloaded by an excessive amount of steam. As a rule of thumb, the larger the volume of the cooking space 3 the smaller the cross-section of the pipes 22 and/or 33.

To accelerate the condensation of steam in the condenser 30 a cooling device 70 may be located in the top part of the condenser housing. In the embodiment shown, this cooling device 70 consists of a battery assembled from elements which can produce cold. For this, so-called Peltier elements may be used to form the top wall 71 of the condenser housing. It is known that Peltier elements produce heat at one end and cold at the other. In the battery the Peltier elements are arranged in such a way that their "cold" ends lie inside the condenser 30. Steam condenses to water more rapidly on these "cold" ends than if no cooling battery is used.

The "hot" ends of the Peltier elements lie on the outside of the top wall 71 of the condenser housing 72. To increase the radiation of heat from the ends of the Peltier elements that are located outside it is possible to assign cooling fins 73 to these ends of the Peltier elements. An aperture 74 is constructed in the top wall 71 of this condenser 30 to allow air to escape.

What is claimed is:

1. A process for cooking food in the cooking cavity of an oven using thermal energy of saturated steam as the energy source comprising:
   (a) spraying water into the cooking cavity;
   (b) heating mist resulting from spraying the water to produce saturated steam;
   (c) discontinuing spraying water once sufficient saturated steam has been produced to prepare food placed into the cooking cavity, while the saturated steam cooks the food;
   (d) after the temperature of the saturated steam has dropped to the point at which the steam is no longer saturated, conveying the steam into a cooling cavity located outside the oven and connected to the cooking cavity;
   (e) cooling the steam rapidly to condense the steam to water and collecting the condensed water on the floor of the cooling cavity;
   (f) after the steam has been condensed, spraying another dose of water into the cooking cavity.

2. The process according to claim 1 wherein the process is preceded by an operating phase during which the temperature in the cooking cavity is increased to a predetermined level.

3. The process according to claim 2 wherein the predetermined temperature level is 85° C.

4. An apparatus for cooking food in a cooking cavity using the thermal energy of saturated steam as the source of energy for cooking the food comprising:
   (a) an oven comprising a cooking cavity including at least one heating element in which the food is cooked;
   (b) a condenser comprising a cooling cavity, said condenser being located outside the oven and connected to the cooking cavity;
   (c) an appliance for injecting doses of water into the cooking cavity of the oven; and
   (d) a control unit for controlling operation of the oven and the condenser.

5. The apparatus according to claim 4 wherein the condenser is located outside the cooking cavity laterally to the cooking cavity or outside of the rear wall of the cooking cavity, wherein first and second pipes traverse the rear wall of the cooking cavity between the interior of the cooking cavity and the outside of the oven;
   (a) wherein the first pipe is located at the top of the cooking cavity and the second pipe is at the bottom of the cooking cavity;
   (b) the condenser is provided with at least one supply line or feeder through which the condenser is connected to the outlet of the second pipe of the oven;
   (c) wherein a supply line is located in the bottom area of the cavity in the condenser;
   (d) a check valve in one of said pipes on the oven and wherein a valve or a plurality of valves is operated or regulated by the control unit.

6. The apparatus according to claim 5 wherein the check valve is arranged in the first pipe.

7. The apparatus according to claim 5 wherein each one of the pipes includes one check valve.

8. The apparatus according to claim 5 wherein the condenser is provided with a second supply line which is located in the upper area of the condenser, said second supply line connecting the condenser to the outlet of the first pipe of the oven carrying steam into the condenser and wherein the check valve is located in the second pipe.

9. The apparatus according to claim 8 wherein a check valve is located in the first pipe.

10. The apparatus according to claim 5 wherein cooling devices are placed on the inside of the condenser to accelerate the condensing of steam to water.

11. The apparatus according to claim 5 wherein the cooling cavity comprises means for rapid cooling of steam.

12. The apparatus according to claim 11 wherein the means for rapid cooling of steam is located in the top part of a condenser housing.

13. The apparatus according to claim 12 wherein the means for rapid cooling of steam is Peltier elements.

14. The apparatus according to claim 5 wherein a means for rapid cooling of steam comprises a battery assembled from Peltier elements, wherein the battery forms the top wall of the condenser housing and wherein the battery of Peltier elements is arranged in such a way that cold ends of the Peltier elements lie inside of the condenser and hot ends of the Peltier elements lie on the outside of the top wall of a condenser housing.

15. The apparatus according to claim 5 wherein an aperture is constructed in the top wall of the condenser to allow air to escape.

16. The apparatus according to claim 5 wherein a container for storing water is installed above the oven, including a duct connected at one end to the floor of the container, whereby this container is constructed as a removable container.

17. The apparatus according to claim 4 wherein the dosing appliance contains at least one heating element which is placed inside the cooking cavity;

wherein the dosing appliance further contains a duct which penetrates one of the walls of the cooking cavity;

wherein the inlet of the duct is connected to a water supply;

at least one valve in said duct controls the supply of water into the cooking cavity, and wherein the outlet of the duct faces towards the dosing appliance, producing mist from water.

18. The apparatus according to claim 5 wherein two throttle valves are placed one after another in a duct, and wherein the control unit controls these valves in such a way that the valves operate alternately.

19. The apparatus according to claim 5 wherein the dosing appliance further contains a turbine wheel having a disk which is secured to a shaft of a motor;

wherein the outlet of a duct is directed towards the outside of the turbine wheel;

a heating element having a depth substantially the depth of the turbine wheel; and the heating element is arranged in such a way that it partly surrounds the turbine wheel whereby the turbine wheel is surrounded by the heating element along its circumference and throughout its depth.

20. The apparatus according to claim 19 wherein the heating element is in the form of an open ring which almost completely surrounds the periphery of the turbine wheel, wherein the heating element comprises a center part and extremities;

wherein each one of the extremities is attached to one of the ends of the center part;

wherein the extremities are located perpendicular to the central part wherein a gap in the heating element is limited laterally by said extremities;

wherein said gap is located in the upper region of the apex of the heating element and wherein said extremities are provided with bushes or sockets to which an energy source can be connected.

21. The apparatus according to claim 19 wherein the heating element comprises three heaters, a first heater, a second heater, and a third heater, wherein each heater includes a center section extending substantially parallel to one of the walls of the cooking cavity;

wherein the center section has the shape of an open pentagon;

wherein an extremity is connected to one of the ends of the respective center sections;

wherein the extremities run virtually perpendicular to the corresponding center section;

wherein the length of the extremities of each heater varies so that the central sections of the heaters are arranged at different distances from the disk of the turbine wheel secured to the motor shaft.

22. The apparatus according to claim 21 wherein the lengths of the extremities are such that the central sections of the heaters lie next to one another when viewed along the shaft of the motor, whereby the extremities of the first heater are the shortest so that the central section of the first heater is closest to the disk, wherein the third heater has the longest extremities and wherein the central section of the second heater is located between the central sections of the first heater and the third heater, so that the adjacent central sections of the heaters can surround substantially the entire with of blades between the disk and a ring connecting the free ends of the turbine blades.

23. The apparatus according to claim 4 wherein the control unit comprises a thermometer having a sensor, and wherein the sensor is placed into the cooking cavity.

24. The apparatus according to claim 4 wherein an outlet is arranged on the outside of one wall of the condenser, wherein the outlet comprises a pipe, one end of which is secured to the outside of the condenser wall;

wherein the lower end of the pipe passes through the condenser wall and the lower end of the pipe terminates inside the condenser in the region of the bottom part of the condenser, and the upper end of the pipe is provided with a damping piece which covers the opening of the upper end of the pipe; and the upper end of the pipe has two sprung tongues facing each other which press the damping piece against the mouth of the pipe.

25. The apparatus according to claim 4 wherein one wall of the cooking cavity comprises two envelopes, an inner envelope and an outer envelope, and the one wall is provided with a safety valve;

wherein a seat of the safety valve is located on the outside of the inner envelope of the one wall having a corresponding opening and a corresponding opening is in the outer envelope;

wherein a valve gate faces a seat of the valve whereby the valve gate is optionally in the form of a disk with a low surrounding wall;

wherein the valve also includes a system for cooperation of the seat and the gate, said system comprising two spacing elements located on the outside of the inner envelope next to the valve seat and which are diametrically opposed to one another in relation to the valve seat;

said system also comprising a strip sufficiently long to bridge a gap between the spacing elements;

an opening in the middle of the strip which lies flush with a threaded hole in the middle section of the rear wall of the valve seat;

wherein a screw goes through the opening in the strip and the bolt of the screw is screwed into a screw hole in the valve gate;

wherein a screw spring surrounds the threaded bolt of the screw;

wherein a first end of the spring is on the inside of the strip and a second end of the spring is on the rear wall of the valve gate;

wherein the head of the screw has a first section and a second section, which sections follow one another in the longitudinal direction the screw;

wherein the first section has a greater diameter than the second section, the second section being the inside section;

wherein the diameter of the first section is greater than the diameter of the opening in the strip;

wherein the second section has a cylindrical outer surface, the diameter of the second section being such that the section can go through the opening in the strip; and wherein the length of the second head section is at least as large as a distance through which the valve gate moves.

* * * * *